United States Patent [19]

Ishikawa

[11] Patent Number: 5,285,368
[45] Date of Patent: Feb. 8, 1994

[54] POWER SOURCE DEVICE RESPONSIVE TO SUPPLEMENTAL PLURAL OUTPUT VOLTAGES

[75] Inventor: Tadashi Ishikawa, Tokyo, Japan

[73] Assignee: Canon Kabushiki Kaisha, Tokyo, Japan

[21] Appl. No.: 842,626

[22] Filed: Feb. 27, 1992

[30] Foreign Application Priority Data

Feb. 28, 1991 [JP] Japan .................. 3-033813
Mar. 20, 1991 [JP] Japan .................. 3-055217

[51] Int. Cl.$^5$ .......................................... H02M 3/335
[52] U.S. Cl. ................................. 363/21; 363/65
[58] Field of Search ............ 363/21, 65, 67; 307/11; 355/69, 219; H02M 3/335, 3/28

[56] References Cited

U.S. PATENT DOCUMENTS

| | | | |
|---|---|---|---|
| 4,230,981 | 10/1980 | Rambold | 363/65 |
| 4,680,688 | 7/1987 | Inou et al. | 363/21 |
| 4,791,528 | 12/1988 | Suzuki et al. | 363/21 |
| 4,868,729 | 9/1989 | Suzuki | 363/21 |

FOREIGN PATENT DOCUMENTS

| | | | |
|---|---|---|---|
| 5131 | 1/1982 | Japan | 363/21 |
| 105312 | 6/1983 | Japan | 363/21 |
| 228252 | 9/1990 | Japan | H02M 3/28 |

*Primary Examiner*—William H. Beha, Jr.
*Attorney, Agent, or Firm*—Fitzpatrick, Cella, Harper & Scinto

[57] ABSTRACT

A power source device is disclosed with a transformer having a plurality of windings provided with the secondary of the transformer, first and second smoothing means connected to a predetermined winding in the plurality of windings, a first voltage detection means for detecting a change of an output voltage from the first smoothing means and means for superimposing an output from the first voltage detection means on an output from the second smoothing means and feeding back a superimposed value to the primary of the transformer. The disclosed power source device has less ripple in the output and is stably responsive to an abrupt change of load.

21 Claims, 13 Drawing Sheets

POWER SOURCE DEVICE RESPONSIVE TO SUPPLEMENTAL PLURAL OUTPUT VOLTAGES

BACKGROUND OF THE INVENTION

1. Field of the Invention

The present invention relates to a power source device, and more specifically, to a power source device suitable for an image formation apparatus such as a copy machine, printer and the like.

2. Related Background Art

Conventionally, a copy machine and printer include various kinds of independent electric components such as a sequence controller circuit with a microprocessor as a central component thereof for controlling a print sequence as a whole, DC power source, power source for exposure, high voltage power source for charging, and the like, and thus the electric components have a limit in miniaturization and cost reduction.

In particular, since high voltage power supplies are arranged in many cases such that the voltage thereof is lowered once by a DC power source and increased again by a transformer, they employ a plurality of transformers which are disadvantageous in cost, volume and weight in electric components and further have a low power efficiency.

To cope with this problem, there is a proposal to employ a transformer having a plurality of low voltage outputs and high voltage outputs to cover almost all the necessary voltage outputs by a single transformer, wherein the primary of the transformer is usually controlled by detecting a particular output of the secondary thereof and other power source outputs are controlled on the secondary by connecting any control means to a next stage.

FIGS. 8A to 8C show an output voltage detection circuit provided with the secondary of a prior art. In the case shown in FIG. 8A, an output from a diode D2 is simply divided to provide an output voltage detection signal r. In the case shown in FIG. 8B, a detection winding N2-1 is provided and an output therefrom is rectified and smoothed by a diode D3 and capacitor C3 and divided by resistors R1 and R2 to provide an output voltage detection signal r. In the case shown in FIG. 8C, an output from a winding N which is similar to a particular output is rectified and smoothed by a diode D3 and capacitor C3 and divided by resistors R1 and R2 to provide an output voltage detection signal r.

Nevertheless, when a system covering a plurality of voltage outputs by a single converter transformer is employed in the prior art, the circuit shown in FIGS. 8A to 8C are used for detecting a particular output of the secondary.

When control is carried out by the same output as in FIG. 8A, a problem arises in that since a capacitor C2 has a large capacity, an output from the diode 2 has a very slow response and the response of a system as a whole using a signal obtained by dividing an output voltage as the output voltage detection signal r has a slow response with the result that a power source system cannot catch up with a load fluctuation and a ripple is increased, whereas when the rippled is reduced, the system is made unstable.

Further, when the detection winding N2-1 is independently provided as in FIG. 8B and an output voltage detection signal proportional to a particular output is used, a problem arises in that a balance between an output from a winding N and an output from the winding N2-1 causes an error, and further since a current flowing through a diode D2 is changed by a change of load although a response characteristic can be relatively freely set by the resistors R1 and R2 and capacitor C3, a particular output voltage is changed by the $V_F/I_F$ characteristic of the diode D2.

When two rectifying/smoothing paths are provided for an output from a converter transformer as in FIG. 8C and a detection system with a time constant sufficiently shorter than that of an output as a power source is provided, a problem arises in that the DC voltage level of a particular voltage output system may be different from that of a sensing system due to a change of the $V_F$ of the diode D2 caused by a change of load.

SUMMARY OF THE INVENTION

Taking the above into consideration, an object of the present invention is to provide a power source device which can control an output level so that it has a correct set value and is excellent in a response characteristic of a control system.

An aspect of the present invention is to provide a power source device provided with an output voltage detection circuit ensuring that a minute change of an output voltage can be quickly detected, a PWM control means for feeding back an output voltage detection signal to the primary to obtain a stable output, and an integrated circuit having a certain circuit portion integrated on the same chip for miniaturization.

Taking the above problems into consideration, an aspect of the present invention is arranged such that the rectifying/smoothing path of the aforesaid output winding is composed of two systems, i.e., a first rectifying/smoothing means for a power source output system and a second rectifying/smoothing means for a detection system, wherein an error of the detection system is superimposed on a dividing signal of the power source output system and a resultant signal is used as an output voltage detection signal.

Another aspect of the present invention includes first and second rectifying/smoothing means each connected to a predetermined winding of the second of a converter transformer, a first voltage detection means for detecting a change of an output voltage from the above first rectifying/smoothing means, and a capacitive coupling means for the above second rectifying/smoothing means and the above first voltage detection means.

Still another aspect of the present invention includes first and second rectifying/smoothing means each connected to a predetermined winding of the second of a converter transformer, a first voltage detection means for detecting a change of an output voltage from the above first rectifying/smoothing means, a capacitive coupling means for superimposing a change of an output voltage from the above second rectifying/smoothing means on a detected voltage level detected by the above first voltage detection means, and a PWM control means for feeding back the detected voltage level of the above first voltage detection means on which the change of the output voltage from the above second rectifying/smoothing means is superimposed to the drive circuit of the switching element of the primary of the converter transformer as an output voltage detection signal.

A further aspect of the present invention includes first and second rectifying/smoothing means each connected to a predetermined first winding of the second of a converter transformer with a plurality of outputs, a first voltage detection means for detecting a change of an output voltage from the above first rectifying/smoothing means, a capacitive coupling means for superimposing a change of an output voltage from the above second rectifying/smoothing means on a detected voltage level detected by the above first voltage detection means, a third rectifying/smoothing means for at least one secondary separate winding for of the above converter transformer, a second voltage detection means for detecting a change of an output voltage from said third rectifying/smoothing means, a switch means for lowering the detected voltage level detected by the above first voltage detection means when the output voltage from the said third rectifying/smoothing means is lowered blow a predetermined value, and a PWM control means for feeding back the detected voltage level detected by the above first voltage detection means to the drive circuit of the switching element of the primary of the converter transformer as an output voltage detection signal.

A further aspect of the present invention is arranged such that the above PWM control means is composed of an analog comparator for comparing a voltage level detected by the voltage detection means with a predetermined value, an up/down counter the count up or count down of which is selected depending upon an output from the analog comparator, a second counter for loading an output value from the above up/down counter in response to a synchronizing pulse from a synchronization detection circuit creating the synchronizing pulse from a waveform of a predetermined winding of the converter transformer or to an overcount signal of the second counter itself, a first digital comparator for comparing an output value from the second counter with a predetermined digital value, a function for outputting an output from the comparator to the drive circuit of a switching element by which the primary of the converter transformer is turned ON and OFF, a second digital comparator for comparing an output from the above second counter with a predetermined digital value to thereby prohibit or permit the loading operation of the second counter performed in response to the above synchronizing pulse, and a third digital comparator for comparing an output value from the above up/down counter with a predetermined value to thereby prohibit or permit the count up operation of the above up/down counter.

A CPU, ROM and RAM, a digital circuit and D/A together with the above PWM control means to form an integrated circuit.

With the arrangement as described above, a minute change of a power source voltage of the secondary is detected to obtain an output voltage detection signal to be fed back to the primary. Further, the use of the PWM control circuit causes the output voltage detection signal to automatically adjust a switching cycle and width of the primary. Further, a power source device having a sequence control function can be provided by the integration of the digital circuit and analog circuit on the same chip.

According to further aspect of the present invention, there is provided a power source device which detects an output from a transformer by a detection unit and controls an input to the transformer in response to the detected signal from the detection unit, wherein the above detection unit superimposes a signal obtained by rectifying an output from the secondary winding of the transformer and deriving the rectified output through a filer including a differential element on a signal obtained by rectifying and smoothing the output from the secondary winding and uses a resultant signal as the above detection signal.

Further, there is provided a power source device wherein a filter is composed of first and second RC parallel circuits connected in series, one end of the second RC parallel circuit is grounded, an end of the first RC parallel circuit serves as the input terminal of the filter, and the common node of the first and second RC parallel circuits serves as the output terminal of the filter.

According to further aspect of the present invention, there is provided a power source device which detects an output from a transformer by a detection unit and controls an input to the transformer in response to the detected signal of the detection unit, wherein the above detection unit capacitive couples a signal obtained by rectifying and an output from the first secondary winding of the transformer and deriving the rectified output through a filter including a differential element to a signal obtained by rectifying and smoothing the output from the first secondary winding of the above transformer and uses a resultant signal as the above detection signal, and the power source device includes a means for lowering the level of the above detected signal when the level of a voltage obtained by rectifying and smoothing an output from the second secondary winding of the above transformer is lowered below a predetermined value.

Further, there is provided a power source device including an analog comparator for comparing a signal detected by a detection unit with a reference value, an up/down counter the count up or count down of which is selected depending upon an output from the analog comparator, a synchronization circuit for creating a synchronizing signal from an output waveform of a predetermined winding of a transformer, a counter for loading an output value from the above up/down counter in response to the above synchronizing signal or to an underflow or overflow of the counter itself, a first digital comparator for comparing an output value from the counter with a predetermined digital value, an switching element for turning ON and OFF the primary of the above transformer depending upon an output from the first comparator, a second digital comparator for comparing the output from the above counter with a predetermined digital value and prohibiting or permitting the load operation of the above counter performed in response to the synchronizing signal depending upon the comparison output thereof, and a third digital comparator for comparing the output value of the above up/down counter with a predetermined digital value and prohibiting or permitting the count up operation of the above up/down counter depending upon the comparison output thereof.

Further, there is provided a power source device composed of an analog comparator, up/down counter, counter, first to third digital counters formed on the same chip together with a digital circuit such as a CPU, ROM, RAM and the like and an analog circuit such as a D/A converter and the like.

With the above arrangement, a signal obtained by rectifying an output from the secondary winding of the transformer and being derived through the filter containing a differential element is superimposed on a signal obtained by rectifying and smoothing the output from the secondary winding of the transformer and a resultant signal is used as a detection signal, and an input to the transformer is controlled in accordance with the detection signal to thereby enable a high speed control.

Further, when the level of a voltage obtained by rectifying and smoothing an output from the second secondary winding is below the predetermined value, the level of the above detection signal is lowered, so that the voltage obtained by rectifying and smoothing the output from the second secondary winding is controlled not to be extremely lowered. Further, malfunction caused by noise and magnetic saturation of the transformer can be prevented by stopping the counting operation of the up/down counter depending upon the overflow and underflow thereof. Further, control can be performed by a single chip by integrating the digital circuit and analog circuit on the chip.

Objects other than the above will be apparent from the following description and drawings.

DETAILED DESCRIPTION OF THE PREFERRED EMBODIMENTS

An embodiment of the present invention will be described below with reference to the drawings.

Figure 1:
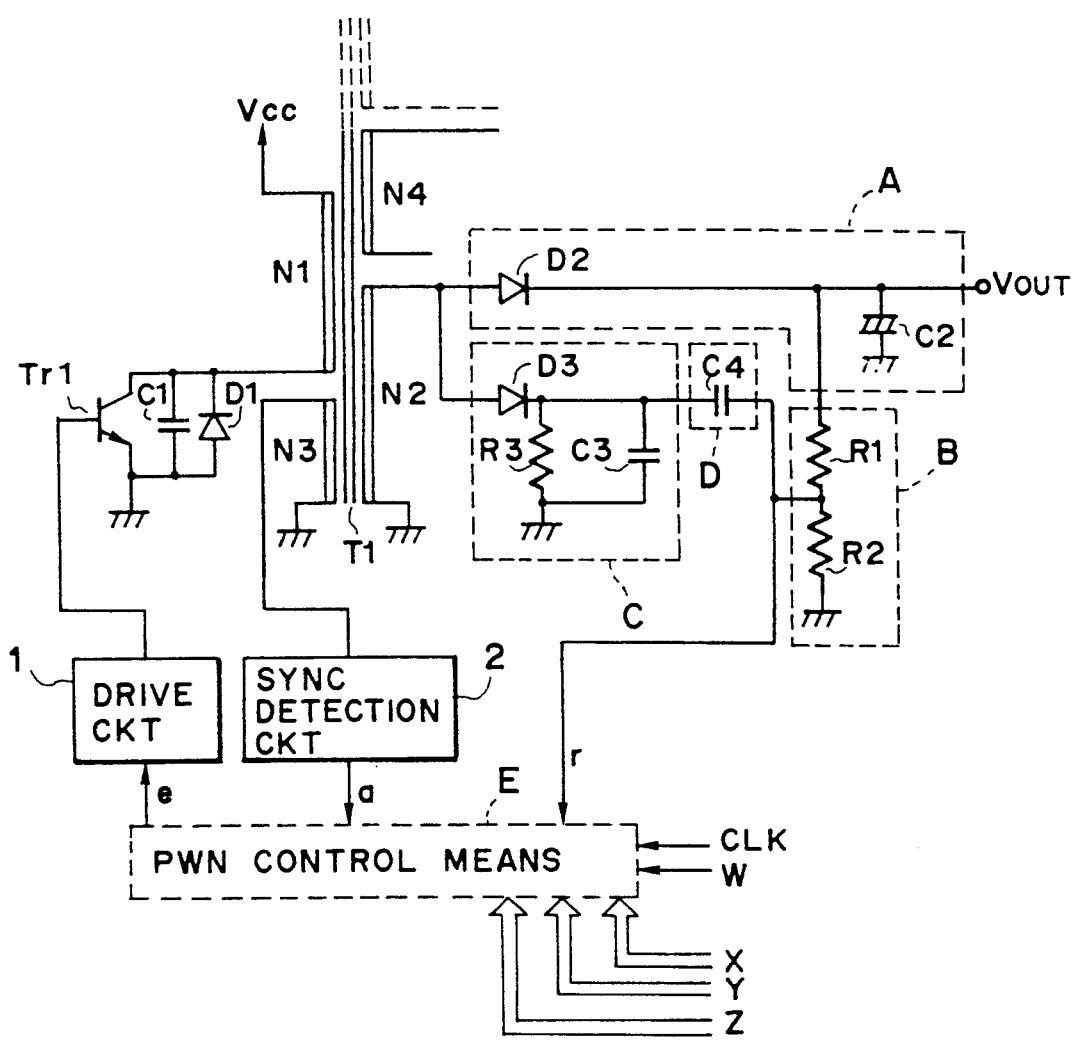
FIG. 1 is a block diagram of a first embodiment.

FIG. 1 is a block diagram of the embodiment according to the present invention.

Figure 2:
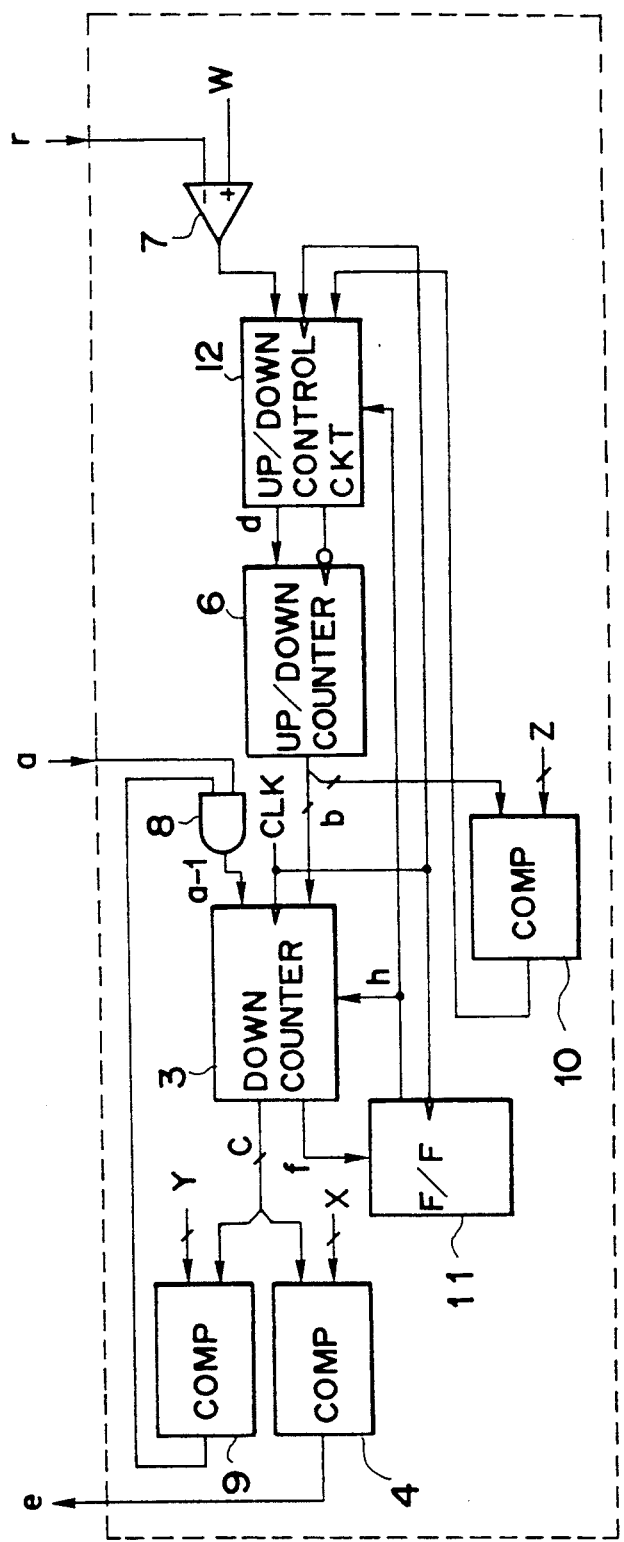
FIG. 2 is a block diagram of a PWM control means of the first embodiment.

FIG. 2 is a block diagram of a PWM control means of the embodiment.

Figure 7:
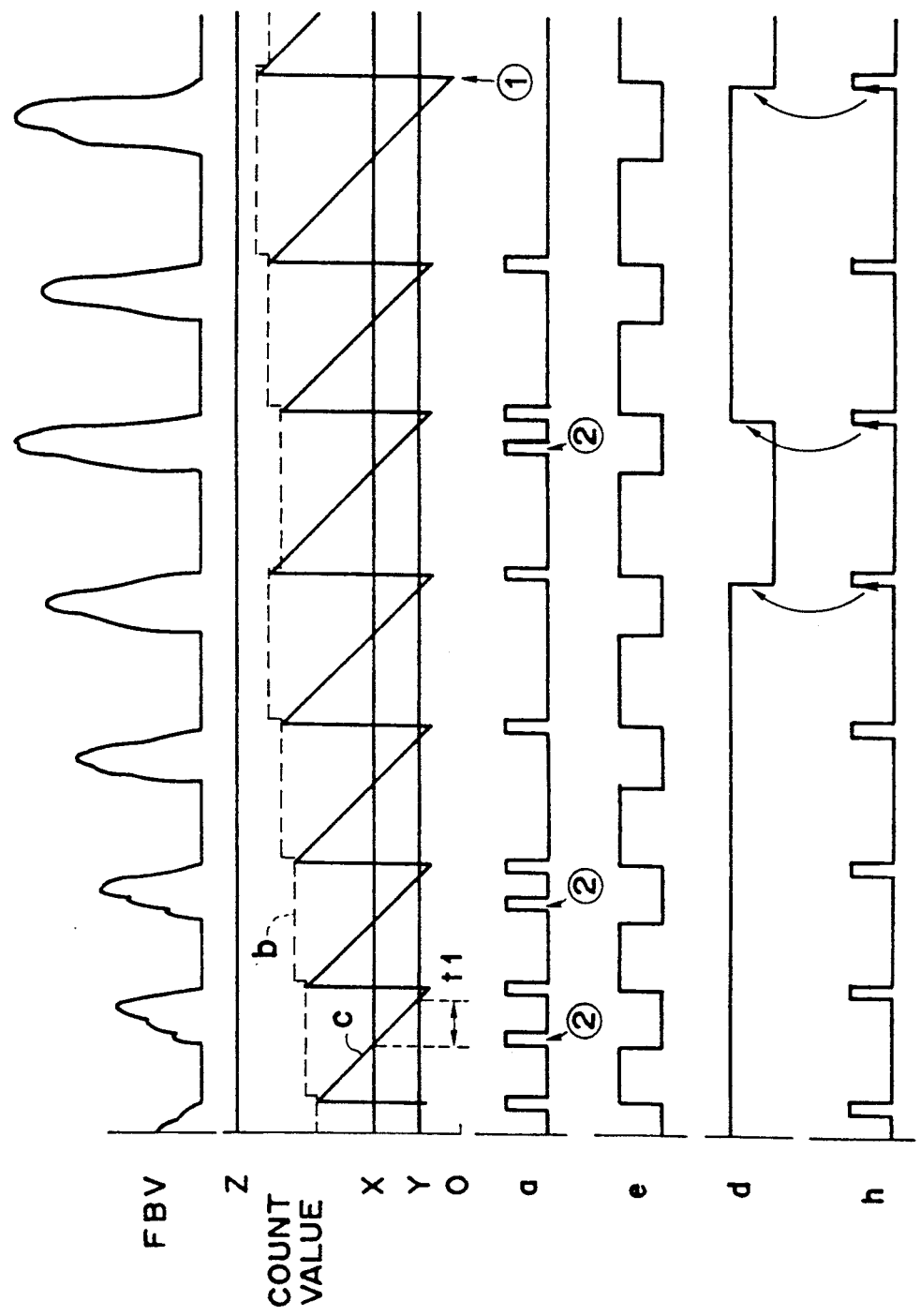
FIG. 7 is a timing diagram of operation of the embodiment.
Figure 8A:
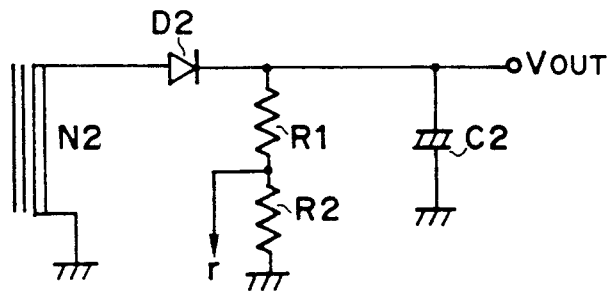
FIGS. 8A to 8C are circuit diagrams of prior art.
Figure 8B:
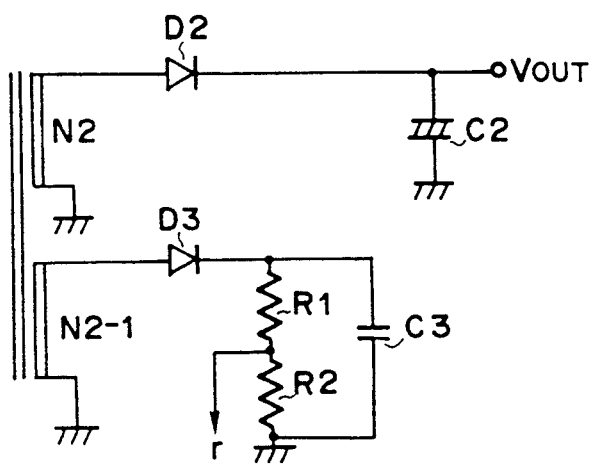
Figure 8C:
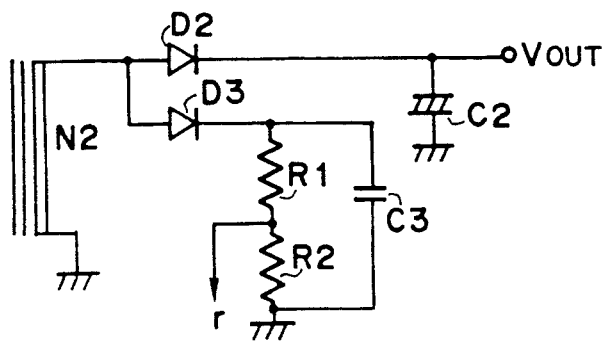

FIG. 7 is a timing diagram of operation of the embodiment.

In the figures, the same numerals are used to designate parts similar to or corresponding to those used in prior art.

In FIG. 1, 1 designates the drive circuit of a switching element; 2 designates a synchronization detection circuit for creating a synchronizing pulse from a flyback voltage made in a converter transformer; Tr1 designates a transistor serving as the switching element; T1 designates the converter transformer; A designates a first rectifying/smoothing means composed of a diode D2 and capacitor C2; B designates a first voltage detection means; C designates a second rectifying/smoothing means composed of a diode D3, resistor R3 and capacitor C3; D designates a capacitive coupling means composed of a capacitor C4; and E designates a PWM control means for feeding back an output voltage detection signal r detected by the first voltage detection means B to the primary.

FIG. 2 shows the PWM control means E, wherein 7 designates an analog comparator for comparing the output voltage detection signal r with a predetermined value w; 6 designates an up/down counter the count up or count down of which is selected depending upon an output from the analog comparator; 3 designates a down counter as a second counter for loading and counting down an output value from the up/down counter; 4 designates a first digital comparator for comparing an output value from the down counter with a predetermined digital value X; 9 designates a second digital converter for comparing the output value from the down counter 3 with a predetermined digital value Y to thereby prohibit or permit the load operation of the down counter 3 performed by the above synchronization pulse a; 10 designates a third digital comparator for comparing the output value from the up/down counter 6 with a predetermined digital value Z to thereby prohibit or permit the count up operation of the up/down counter 6; 8 designates a gate circuit for creating a preload signal a-1 of the down counter 3 by the synchronization pulse a; 12 designates an up/down control circuit for controlling a count mode of the up/down counter 6; and 11 designates a flipflop circuit for creating a load signal h to the down counter 3 by an underflow signal f of the down counter 3.

First, operation will be described with reference to FIG. 1.

The primary winding N1 of the converter transformer T1 is connected to a power source voltage Vcc and the other end of the primary winding N1 is connected to the collector of the transistor Tr1 as the switching element. The emitter of the transistor Tr1 is grounded and a capacitor C1 and diode D1 are connected between the collector and ground. The capacitor C1 is used to resonate with the primary winding N1 to effectively perform a voltage conversion and the diode 1 is used to protect the transistor Tr1. The transistor Tr1 is switched to produce a desired voltage at a secondary winding N2 in accordance with a winding ratio. This embodiment is provided with a detection winding N3. An end of the detection winding N3 is grounded and the other end thereof is connected to the input of the synchronization detection circuit 2. The output of the synchronization detection circuit 2 is connected to the gate 8 of the PWM control means E as a synchronization pulse a.

Next, an output from the secondary winding N2 of the converter transformer is rectified and smoothed by the first rectifying/smoothing means A and externally output as a power source output. This output is divided by the first voltage detection means B to obtain a basic DC signal. Further, an output from the secondary winding N2 is rectified and smoothed the second rectifying/smoothing means C and supplied through the capacitor C4 of the capacitive coupling means D to the dividing point of the above first voltage detection means B as an AC error signal.

In this case, the resistor R3 and capacitor C3 of the second rectifying/smoothing means C have a time constant which is made sufficiently smaller than that made by the capacitor C2 of the first rectifying and smoothing means A and a not shown load, and this time constant as well as a time constant of the capacitor C4 of the capacitive coupling means D must be set to a proper value, taking a response characteristc as a power source, allowable ripple value and the like into consideration.

As described above, the $V_F/I_F$ characteristic of the diode D2 of the first rectifying/smoothing means A is removed by the output voltage detection signal r obtained by superimposing the AC error signal on the basic DC signal and thus the power source output has a set value as an effective value at all times. When a load is changed, a system is controlled by the AC error signal supplied by the second rectifying/smoothing means C through the capacitive coupling means D, and thus the system can sufficiently catch up with the change of the load.

Next, operation of the PWM control means will be described with reference to FIG. 2.

The synchronizing pulse a of an output from the above synchronization detection circuit 2 is connected to the preload terminal of the counter 3 through the gate 8. When a signal is input to the preload terminal, the counter 3 is forced to create an underflow and the underflow output f is connected to the load terminal of the down counter 3 and at the same time input to the up/down control circuit 12, through the flipflop 11.

The counter 3 is driven by a clock signal CLK of a not shown original oscillation circuit generating a frequency sufficiently larger than a resonance frequency generated by the capacitor C1 and primary winding N1. The up/down counter 6 is connected to the data input terminal of the counter 3, the data input terminal being used to set data input when a load signal is input to the counter 3. The counter 6 is up counted or down counted by the up/down control circuit 12 which creates an up/down signal and clock from an output from the analog comparator 7, which detects an output voltage from the output winding N2 of the converter transformer T1 and compares a thus obtained output voltage detection signal r with a preset analog value w, and outputs from the digital comparator 10 and flipflop 11. An output from the counter 3 is connected to the comparators 4 and 9, and the comparator 4 compares the output from the counter 3 with the input set value X to produce a pulse signal. The drive circuit 1 shown in FIG. 1 drives the transistor Tr1 as the switching element in response to the pulse signal.

Further, the comparator 9 compares the output value from the down counter 3 with the set value Y to thereby turn ON or OFF the gate 8 which outputs an output from the synchronization detection circuit 2 to the preload terminal of the down counter 3. In addition, the comparator 10 compares an output value from the up/down counter 6 with the input set value Z and inputs the result of the comparison to the up/down control circuit 12.

Further, the comparator 10 regulates the upper limit of the up/down counter 3 by comparing the same with the set value Z. This is effected for the purpose of preventing the transistor Tr1 from being destroyed which is caused when a pulse cycle is extremely increased so that the transformer is saturated and a large current flows through the transistor Tr1. When the comparator 10 is made active, an output d from the up/down control circuit 12 is forcibly made to a down mode.

Next, description will be made with reference to the operation timing diagram shown in FIG. 7.

A waveform designated by FBV shows a flyback voltage produced to the converter transformer T1. First, when a value of the counter 3 designated by c is larger than a set value designated by X in the figure, the transistor Tr1 is turned ON by the comparison performed by the comparator 4 in response to a drive signal e of the drive circuit 1, whereby a Vcc is imposed on the primary winding N1. Next, when the counter 3 is counted down so that the value thereof is smaller than the set value X, an output from the comparator 4 is inverted to thereby turn OFF the transistor Tr1. As a result, the converter transformer T1 is voltage resonated with the capacitor C1 and thus a flyback voltage shown in the Figure is produced to each winding of the converter transformer T1. The flyback voltage is detected by the synchronization detection circuit 2, a synchronizing pulse a is produced when the flyback voltage falls, and a preload signal a-1 of the counter 3 is input through the gate 8.

The preload signal a-1 forces the down counter 3 to create an underflow. Even if the preload signal is not produced by any reason, the down counter 3 produces an underflow f when it is down counted below 0 (shown by ①). When the underflow f is created, a load signal h is input to the down counter 3 through the flipflop 11, an output value from the up/down counter 6 is loaded on the down counter 3 and thus the transistor Tr1 is turned ON again. The above sequence constituting a single cycle is repeated.

Further, the comparator 9 compares the output from the counter 3 and the input set value Y to open or close the gate 8, by which a necessary minimum OFF period (t1, i.e., X-Y) is obtained even if the synchronizing pulse a is created at a timing other than a desired timing due to noise and the like. With this arrangement, the transistor Tr1 is prevented from being turned ON before the flyback voltage does not become 0 V and thus the transistor Tr1 is prevented from being destroyed (② in the figure shows a timing synchronizing signal at a timing other than a desired timing).

On the other hand, the up/down control circuit 12 creates an up/down signal d and clock from an output from the comparator 10 and a load signal h of the flipflop 11 and outputs the same to the up/down counter 6. This is because that if an up/down operation is not generally performed at a suitable timing in synchronism with the load signal h, there is a possibility that data which is unstable in the midway of change is loaded on the down counter 3, and then the up/down operation is switched at the rising of the load signal h and the up/down counter 6 is driven at the falling thereof in the figure. When the up/down counter 6 has a larger value, the transformer has a longer ON time and an increased output voltage, whereas when the up/down counter 6 has a smaller value, the transformer has a lowered output voltage. Therefore, a count value of the up/down counter 6 is sequentially counted up, and when an output voltage Vout reaches a predetermined value, i.e., the set value w of the comparator 7, an output from the comparator 7 is repeatedly inverted.

Figure 3:
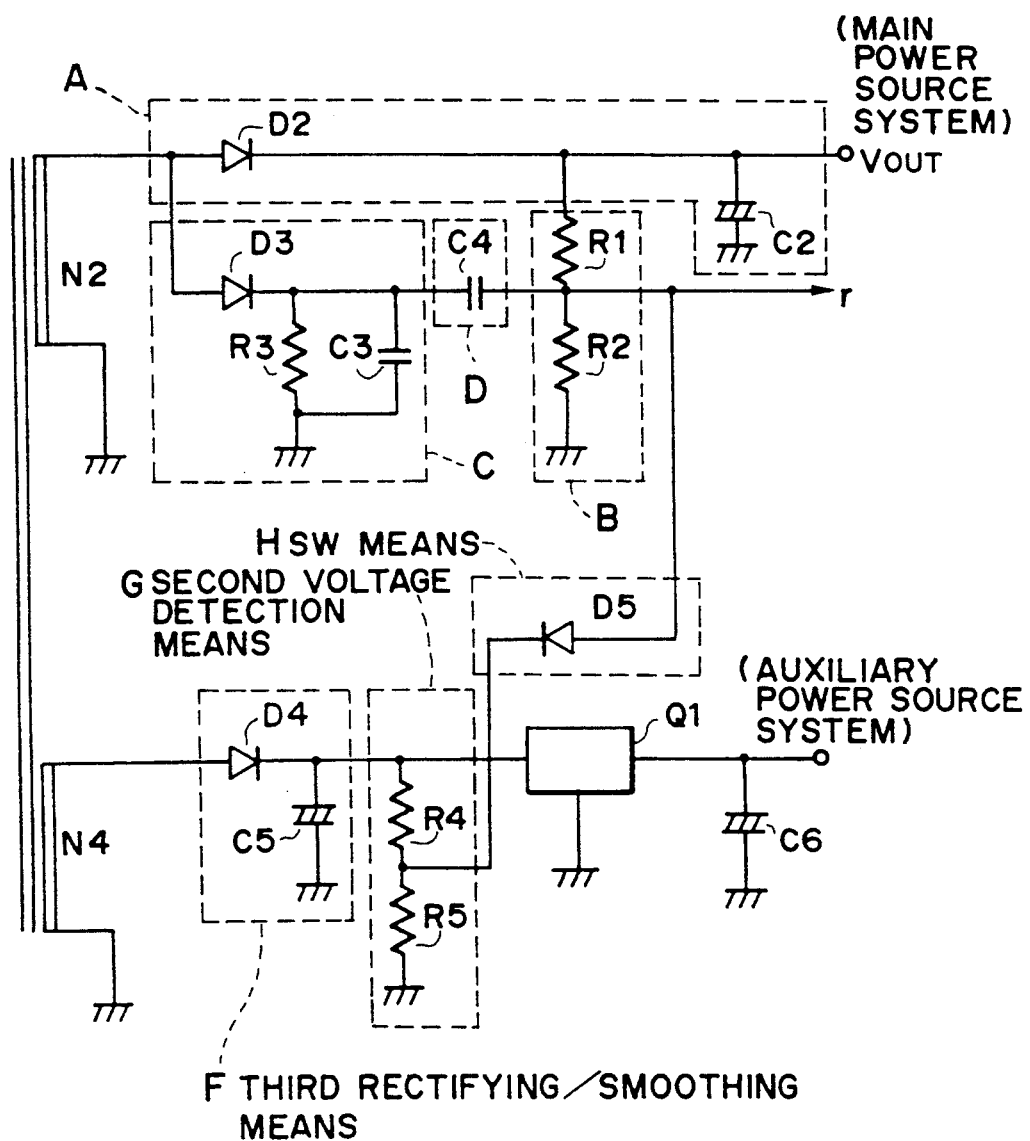
FIG. 3 is a circuit diagram of a second embodiment.

Next, a second embodiment will be described with reference to FIG. 3, wherein the same numerals are used to designate parts similar to or corresponding to those used in the first embodiment.

The second embodiment is mainly applied to a multi-output transformer. In this case, an auxiliary power source system is controlled by a chopper type switching regulator or series regulator disposed on secondary outputs. Nevertheless, when a load on a main power source system is abruptly reduced, switching on the primary is almost stopped and thus a power supply to the auxiliary power source system may be lowered below a necessary level.

To cope with this problem, the second embodiment is arranged such that an output voltage from a third rectifying/smoothing means F of the auxiliary power source system F is detected by resistors R4 and R5 serving as a voltage detection means G, and when the output voltage is lowered below a threshold value, a diode D5 serving as a switching means H is turned ON to lower an output voltage detection signal r to thereby resume the switching of the primary. In the second embodiment, the auxiliary power source is implemented by a 3-terminal regulator Q1. In this case, a constant of the resistors R4 and R5 must be set, taking the output compensation voltage of the 3-terminal regulator Q1, the $V_F$ component of the diode D5, and the dividing voltage level of resistors R1 and R2 into consideration.

Figure 4:
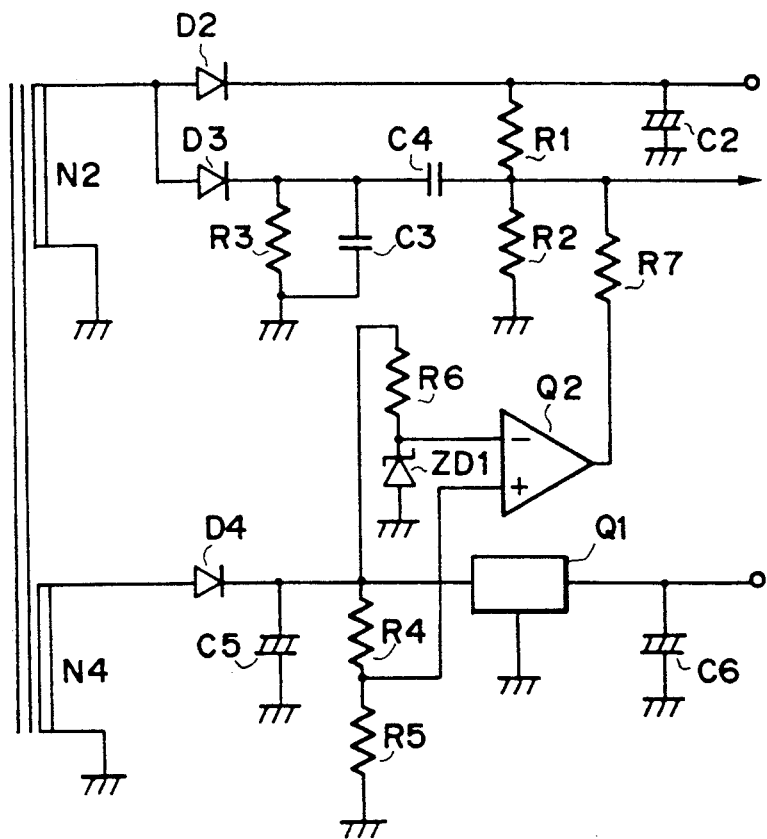
FIG. 4 is a circuit diagram of a third embodiment.

Next, a third embodiment will be described with reference to FIG. 4.

The third embodiment is executed when the second embodiment is in such a condition that an output compensation voltage of the 3-terminal regulator Q1, a dividing voltage level of the resistors R1 and R2, a $V_F$ component of the diode D5, and a dividing voltage level of the resistors R4 and R5 are complicatedly interconnected so that a constant of the resistors R4 and R5 is difficult to be set or sometimes any optimum value is not available for them. More specifically, when the dividing voltage level of the resistors R4 and R5 is lowered below a threshold value created by a zener diode ZD1, an analog comparator Q2 is turned ON to thereby forcibly lower an output voltage detection signal r to a low level. When a diode D4 has a sufficient output, the comparator Q2 is turned OFF.

Figure 5:
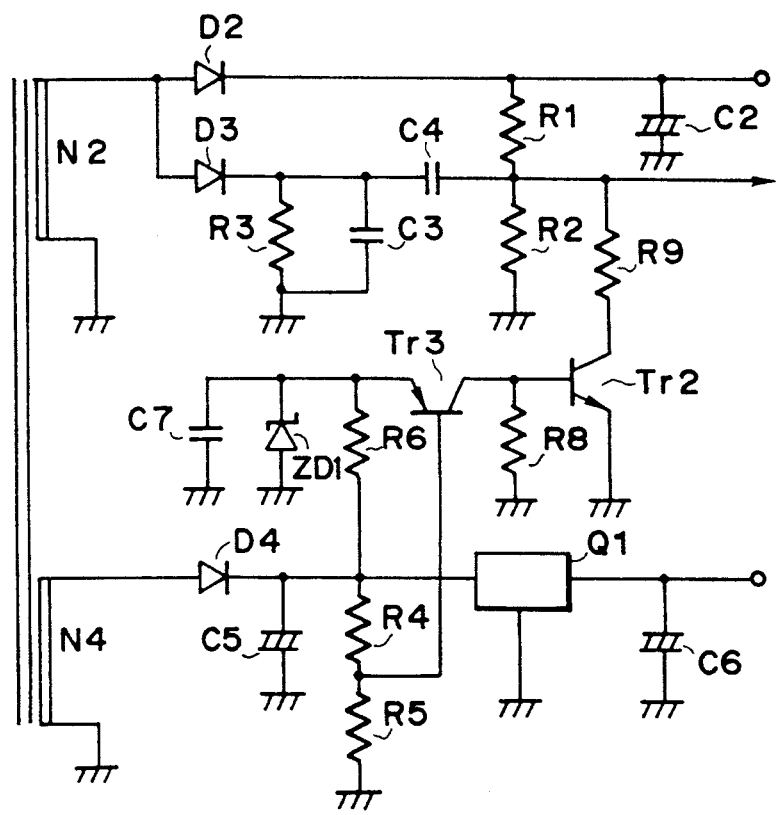
FIG. 5 is a circuit diagram of a fourth embodiment.

Next, a fourth embodiment will be described with reference to FIG. 5.

In this case, an output voltage detection signal r is lowered by transistors Tr2 and Tr3, while the third embodiment employs the comparator for this purpose. When an output from a diode D4 is lowered, a dividing signal of resistors R4 and R5 is lowered to thereby turn ON the transistor Tr3. The turning ON of the transistor Tr3 causes the transistor Tr2 to be turned ON, and thus the output voltage detection signal r is lowered to resume switching of the primary.

The second to fourth embodiments can be applied to a power source with three or more output systems.

Next, a fifth embodiment will be described with reference to FIG. 6.

Figure 6:
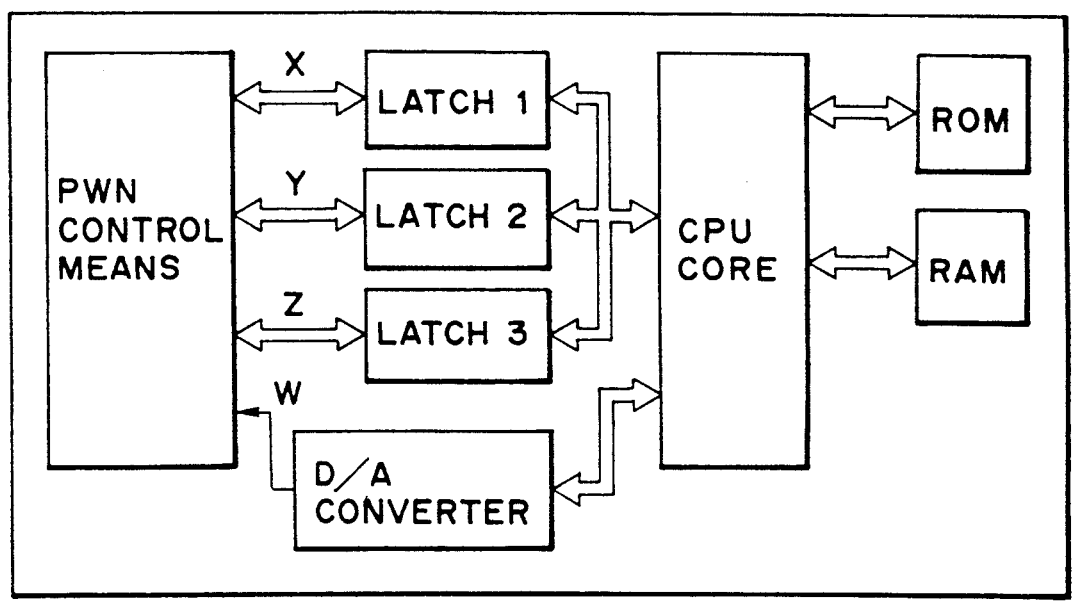
FIG. 6 is a block diagram of a fifth embodiment.

FIG. 6 is a simple block diagram of an example in which the PWM control circuit shown in Figure, a CPU, ROM, RAM and a digital circuit annexed to them, and a D/A converter and an analog circuit annexed to it are integrated on the same chip. Almost all the power sources and sequences of a copy machines, printer and the like can be controlled by this integrated circuit.

As described above, according to the above embodiments, since a power source can be controlled so that a DC level of a power source output can be correctly set to a predetermined value and the response characteristic of a control system is not deteriorated, a power source device with a less change of load and less ripple can be realized. Further, the power source device can be reduced in size and cost by arranging a certain portion of the circuit thereof as an integrated circuit.

In the first to fifth embodiments described above, however, although a DC control accuracy is improved, there remains a possibility that a control cannot catch up with the response characteristic of a load and power source system and ripple is increased because a detected signal is smoothed and superimposed on a DC detection signal by a capacitive coupling.

More specifically, a low-pass filter is composed of the R3 and C3 in the above embodiments and a response to an abrupt change of load is generally not good, and thus there is a possibility that a large amount of ripple results from an abrupt change of load.

Embodiments by which the above embodiments are further improved through the improvement of the characteristic of control ripple will be described. A detection unit B of the following embodiments creates a basic C detection signal by dividing an output from a diode D2 serving as a power source output in the same way as the first to fifth embodiments. A signal rectified by a diode D3 from the same winding N2 and passed through a filter composed of an RC network of elements R3, R4, C3 and C5 is superimposed on the basic DC detection signal by a capacitor C4 as an AC detection signal. With the arrangement of these embodiments, an effect caused by the $V_F/I_F$ characteristic of the diode D2 can be removed and thus a power source value has a set value as an r.m.s value regardless of a change of a load current. Further, a response characteristic of a control system is determined by the above AC detection signal.

An abruptly changing component is supplied by the capacitor, i.e., the differential element C5 connected in parallel to the resistor R4 through the capacitor C4 as the AC detection signal. As a result, the power source system is responsive even to an abrupt change of load.

Sixth to tenth Embodiments will be described below in detail.

Figure 9:
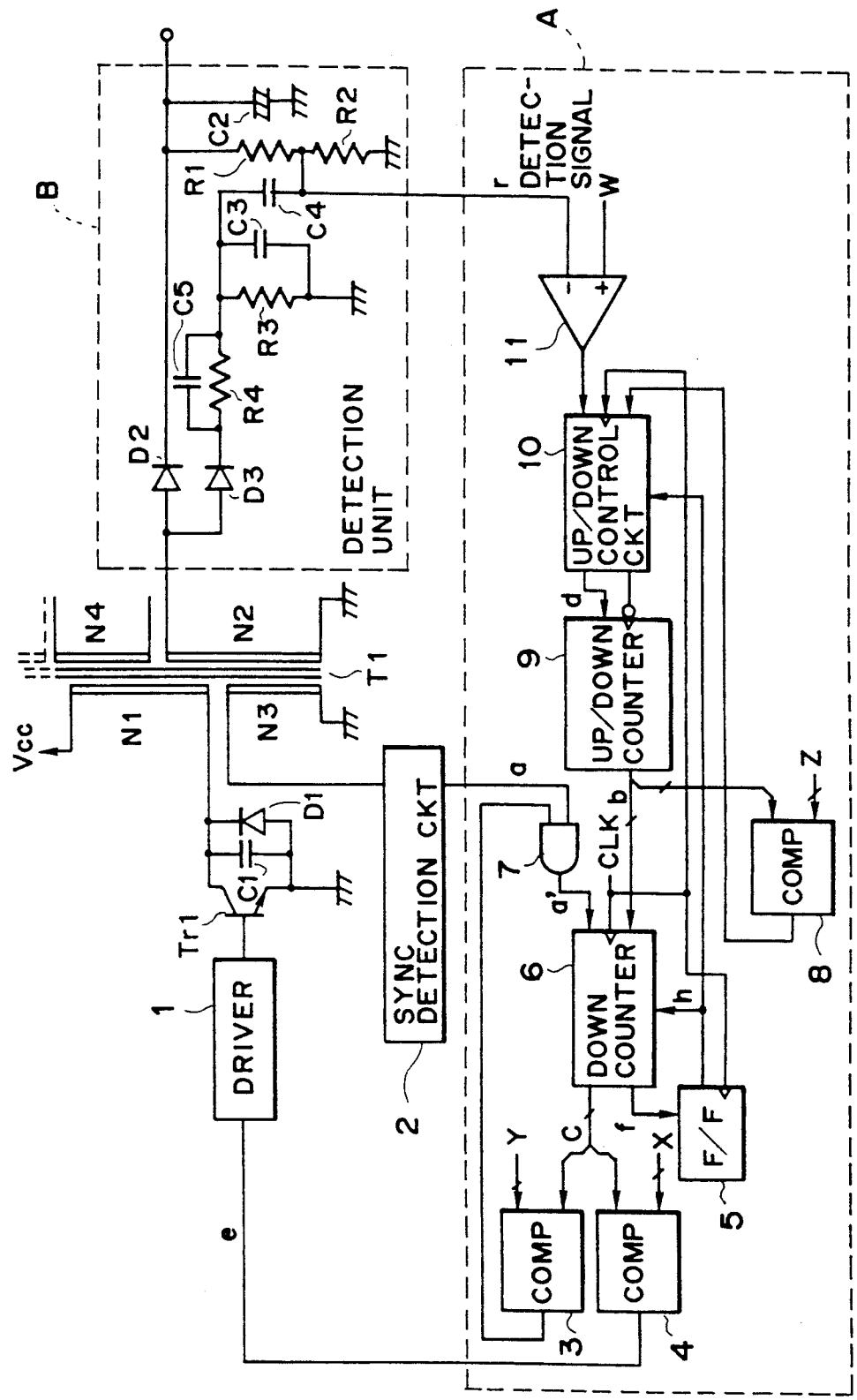
FIG. 9 is a block diagram of a sixth embodiment.

FIG. 9 is a block diagram of a "power source device" as the sixth embodiment, wherein Ti designates a converter transformer. A power source voltage Vcc is supplied to one end of the primary winding N1 of the converter transformer T1 and the other end thereof is connected to the collector of a transistor Tr1 serving as a switching element. The emitter of the transistor Tr1 is grounded and further a capacitor C1 and diode D1 are connected between the collector and ground. The capacitor C1 is used to perform an effective voltage conversion by being resonated with a primary winding N1 and the diode D1 is used to protect the transistor Tr1.

When the transistor Tr1 is switched, a desired voltage is produced to a secondary winding N2 in accordance with a winding ratio. This embodiment is provided with a synchronization detection winding N3. One end of the detection winding N3 is grounded and the other end thereof is connected to the input of a synchronization detection (flyback voltage detection) circuit 2. An output from the synchronization detection circuit 2 is supplied to the preload terminal of a down counter 6 through an AND gate 7 as a timing synchronizing signal.

When a signal a' is supplied to the preload terminal, the down counter 6 is forced to create an underflow output which is supplied to the load terminal of the down counter 6 through a flipflop 5 and at the same time input to an up/down control circuit 10.

The down counter 6 is driven by a clock of a not shown oscillation circuit producing a frequency sufficiently higher than a resonance frequency. The output terminal of an up/down counter 9 is connected to the data input terminal of the down counter 6, the data input terminal being used to set data which is input when a load signal is input. The up/down counter 9 detects an output voltage from the output winding N2 of the converter transformer T1 by a method described below and is up counted or down counted by the up/down control circuit 10 which creates an up/down signal and clock from an output of a voltage detection unit 11 by which the above voltage signal is compared with a preset analog value and outputs from a comparator 8 to be described below and the flipflop 5. An output from the down counter 6 is supplied to comparators 4 and 3 and the comparator 4 compares the output value from the down counter 6 with a set value X to produce a pulse signal. A driver 1 drives the transistor Tr1 in response to the pulse signal.

The comparator 3 compares the output value from the down counter 6 with a set value Y to thereby turn ON and OFF the AND gate 7 which outputs an output from the synchronization detection circuit 2 to the preload terminal of the down counter 6.

Further, a comparator 8 compares an output value from the up/down counter 9 with a set value Z and inputs a result of the comparison to the up/down control circuit 10. More specifically, the comparator 8 regulates the upper limit of the up/down counter 9 by comparing the same with the set value Z, which prevents the transistor Tr1 from being broken by a large current flowing therethrough when a pulse cycle is made extremely large and the transformer is magnetically saturated. When the comparator 8 is active, an output d from the up/down counter 10 is forcibly made to a down mode.

Incidentally, an output from the secondary winding N2 is rectified by a diode 2 and further smoothed by a capacitor C2 and externally output as a power source output. Then, a detection unit B is arranged as follows in the present embodiment. More specifically, the above power source output is divided by resistors R1 and R2 and input to the comparator 11 as a basic control DC signal. Further, the output from the secondary windin N2 is rectified by a diode 3, detected through a filter (RC network) composed of elements R3, R4, C3 and C5, and connected through a capacitor C4 to the above dividing point of the resistors R1 and R2, i.e., the point at which a DC signal is detected. In this case, although a time constant provided by the elements R3, R4 C3 and C4 is sufficiently smaller than that by the capacitor C2 and load, this time constant as well as that of the capacitor 4 are set to a suitable value, taking a response characteristic as a power source, allowable ripple value and the like into consideration.

Figure 10:
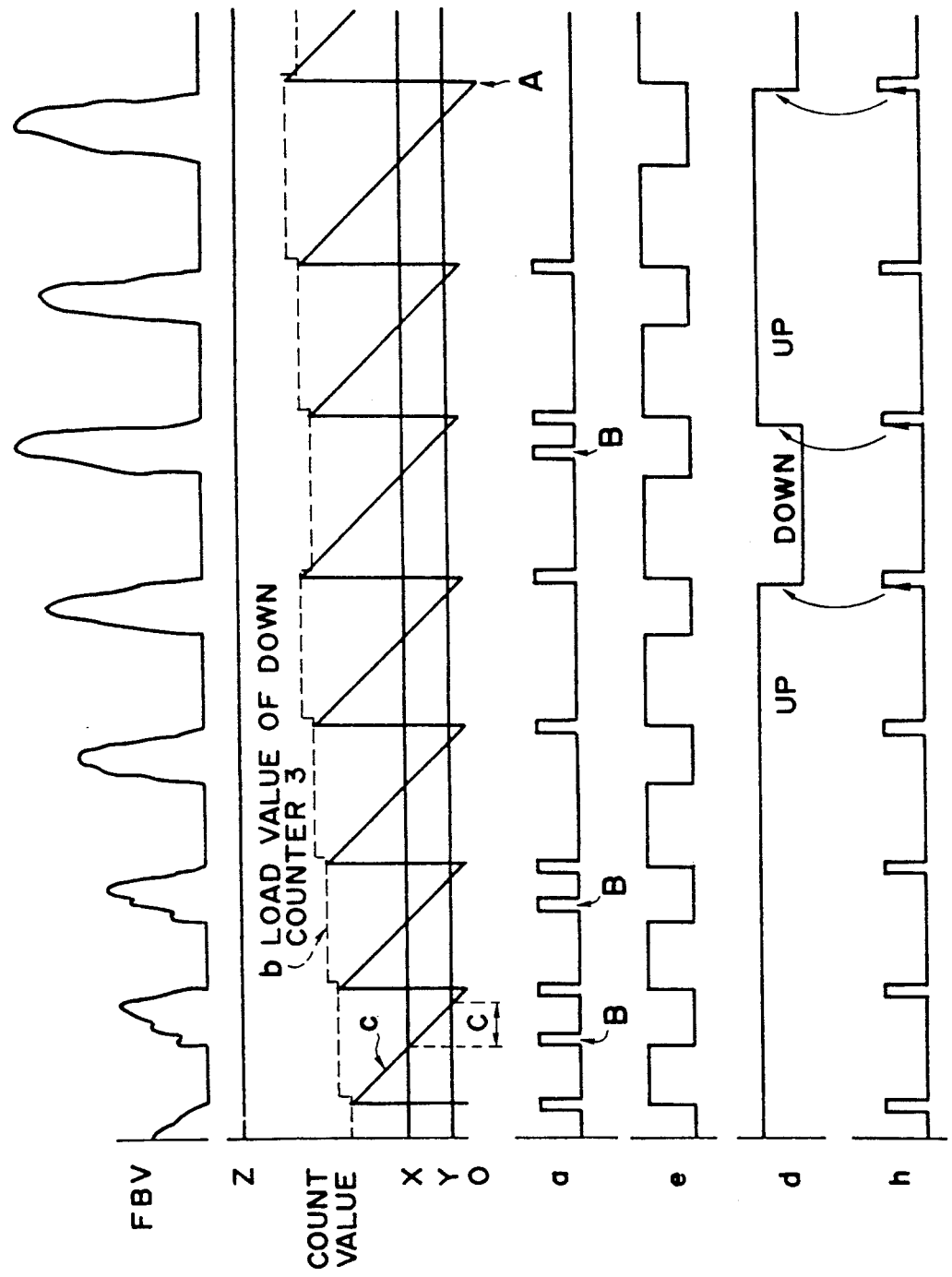
FIG. 10 is a timing chart of the sixth embodiment.

Next, operation of the above arrangement will be described with reference to a timing chart of FIG. 10. A waveform designated by FBV shows a flyback voltage produced to the converter transformer T1. First, when a value of the down counter 6 designated by c is larger than a set value designated by X in the figure, the transistor Tr1 is turned ON by the comparison performed by the comparator 4 in response to a drive signal e of the driver 1, whereby a power source voltage Vcc is imposed on the primary winding N1. Next when the down counter 6 is counted down so that the value thereof is smaller than the set value X, an output from the comparator 4 is inverted to thereby turn OFF the transistor Tr1. As a result, the primary winding N1 of the converter transformer T1 is voltage resonated with the capacitor C1 and thus a flyback voltage FBV shown in the Figure is produced to each winding of the converter transformer T1. The flyback voltage FBV is detected by the synchronization detection circuit 2, a detection pulse a is produced when the flyback voltage falls, and a preload signal a' is input to the down counter 6 through the AND gate 7.

The preload signal a' forces the down counter 6 to create an underflow. Even if the preload signal is not produced by any reason, the down counter 6 produces an underflow when it is down counted below 0 (shown by A in FIG. 3). When the underflow is created, a load signal is input to the down counter 6 through the flipflop 11, an output value from the up/down counter 9 is loaded on the down counter 6 and thus the transistor Tr1 is turned ON again. The operation of the above sequence is repeated as a cycle in the same way thereafter.

Further, the comparator 3 compares the output from the down counter 6 with the set value Y to turn OFF the AND gate 7 until a count number of the down counter 6 is below Y, by which a necessary minimum OFF period (C, i.e., X-Y) is obtained even if the synchronizing pulse a is created at a timing other than a desired timing due to noise and the like. With this arrangement, the switching transistor Tr1 is prevented from being turned ON before the flyback voltage FVB does not become 0 V to thereby prevent the switching transistor Tr1 from being destroyed (B in the figure designates a timing synchronizing signal at a timing other than a desired timing).

On the other hand, the up/down control circuit 12 creates an up/down signal and clock from an output from the comparator 8 and a load signal of the flipflop 11 and outputs the same to the up/down counter 9. This is because that if switching between up count and down count is not performed at a suitable timing in synchronism with the load signal, there is a possibility that data which is unstable in the midway of change is loaded on the down counter 3. In the figure, the up/down is switched at the rising of the load signal and the up/down counter is driven at the falling thereof. When the down counter 3 has a larger value, the transformer T1 has a longer ON time and an increased output voltage, whereas when the up/down counter 3 has a smaller value, the transformer has a lowered output voltage. Therefore, a count value of the up/down counter 9 is sequentially counted up, and when an output voltage Vout reaches a predetermined value, i.e., the set value W of the comparator 11, an output from the comparator 11 is inverted and counted down, and thus count up and count down are repeated in this manner. Note that an up counter may be used in place of the down counter 6, and in this case an output value from the up/down counter 9 is loaded by overflow.

Figure 11:
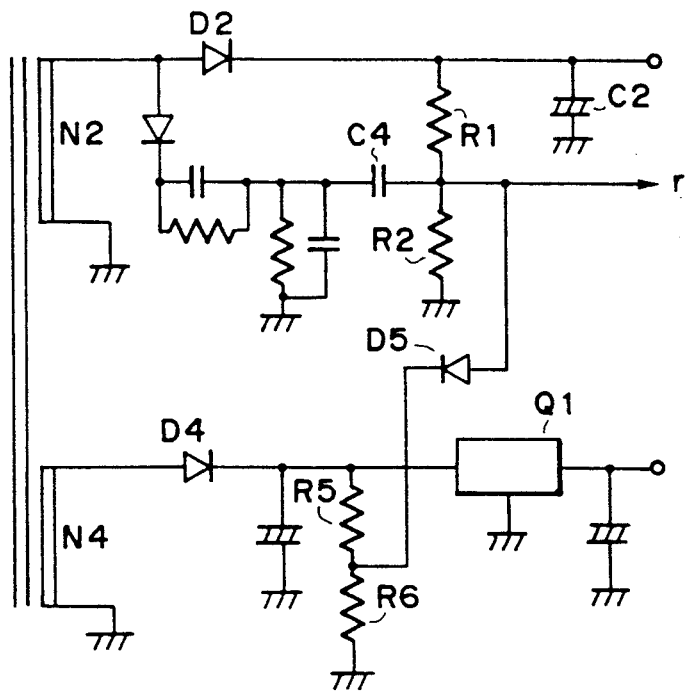
FIG. 11 is a circuit diagram of a detection unit of a seventh embodiment.

As described above, the present invention is mainly applied to a multi-output transformer. In this case, an auxiliary power source system is controlled by a chopper type switching regulator or series regulator disposed on secondary outputs. Nevertheless, when a load on a main power source system is abruptly reduced, switching on the primary is almost stopped and a power supply to the auxiliary power supply system may be lowered below a necessary level. Thus, a seventh embodiment has a detection unit arranged as shown in FIG. 11. The other parts of the seventh embodiment except the above is similar to those shown in FIG. 9. More specifically, a voltage of an auxiliary power source system is detected by R5 and R6, and when a detected voltage is lowered below a threshold value, i.e.

a necessary value, a diode D5 is turned On to lower a detection signal r to thereby resume the switching of the primary of the transformer T1. The auxiliary power source system in this embodiment is stabilized by a 3-terminal regulator Q1. In this case, a constant of the resistors R5 and R6 must be set, taking the output compensation voltage of the 3-terminal regulator Q1, the $V_F$ component of the diode D5, and the dividing voltage level of resistors R1 and R2 into consideration.

Figure 12:
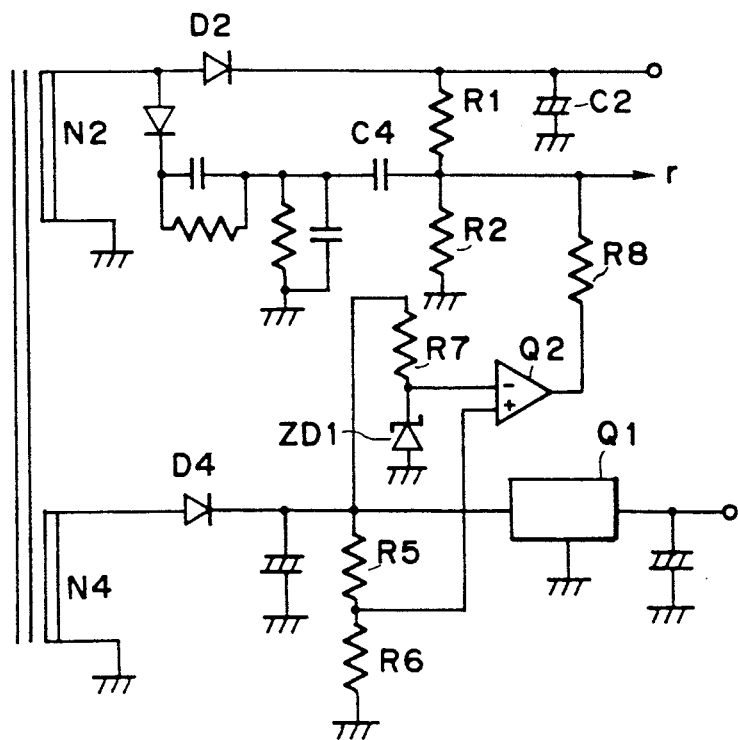
FIG. 12 is a circuit diagram of a detection unit of an eighth embodiment.

FIG. 12 shows a detection unit of an eighth embodiment. The other parts of this embodiment are similar to those shown in FIG. 9. This embodiment is implemented when the seventh embodiment is in such a condition that the output compensation voltage of the 3-terminal regulator Q1, the dividing voltage level of the resistors R1 and R2, the $V_F$ component of the diode D5 and the dividing voltage level of the resistors R5 and R6 are complicatedly interconnected so that a constant of the resistors R5 and R6 is difficult to be set or sometimes any optimum value is not available for them. More specifically, when a dividing voltage level of the resistors R5 and R6 is lowered below a threshold value, i.e., a necessary value created by a zener diode ZD1, a comparator Q2 is turned ON to thereby forcibly lower a voltage detection signal r to a low level. When a diode D4 has a sufficient output, the comparator Q2 is turned OFF.

Figure 13:
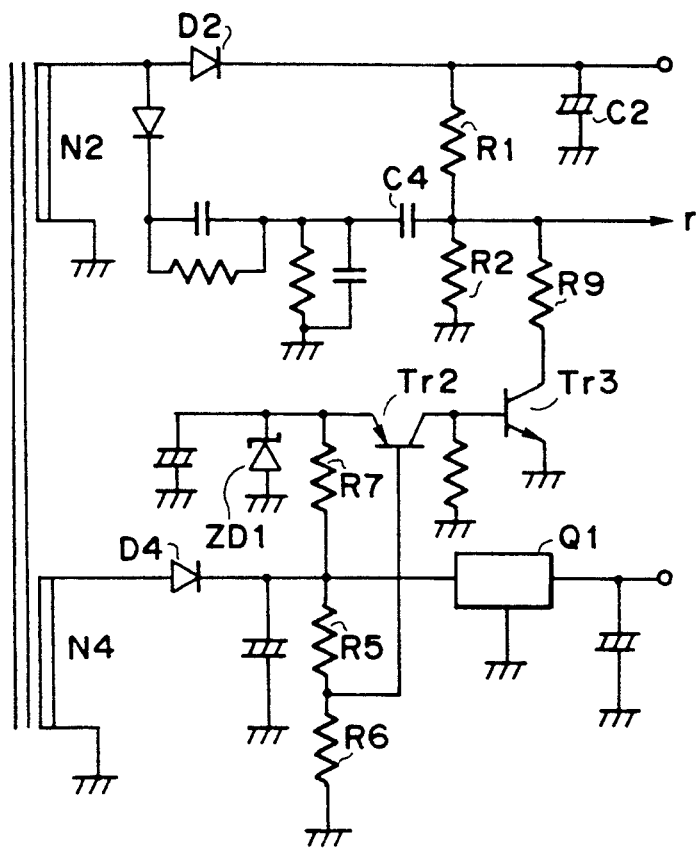
FIG. 13 is a circuit diagram of a detection unit of a ninth embodiment.

Next, FIG. 13 shows a detection unit of a ninth embodiment.

In this case, a detection signal r is lowered by transistors Tr2 and Tr3, although the eighth embodiment employs the comparator Q2 for this purpose. When a DC output from a winding N4 is lowered, a dividing signal of resistors R5 and R6 is lowered to thereby turn ON the transistor Tr2. The turning ON of the transistor Tr2 causes the transistor Tr3 to be turned ON, so that a detection signal r is lowered to thereby resume the switching of the primary of the transformer T1. Note that the seventh to eighth embodiments can also be applied to a power source with three or more outputs.

Figure 14:
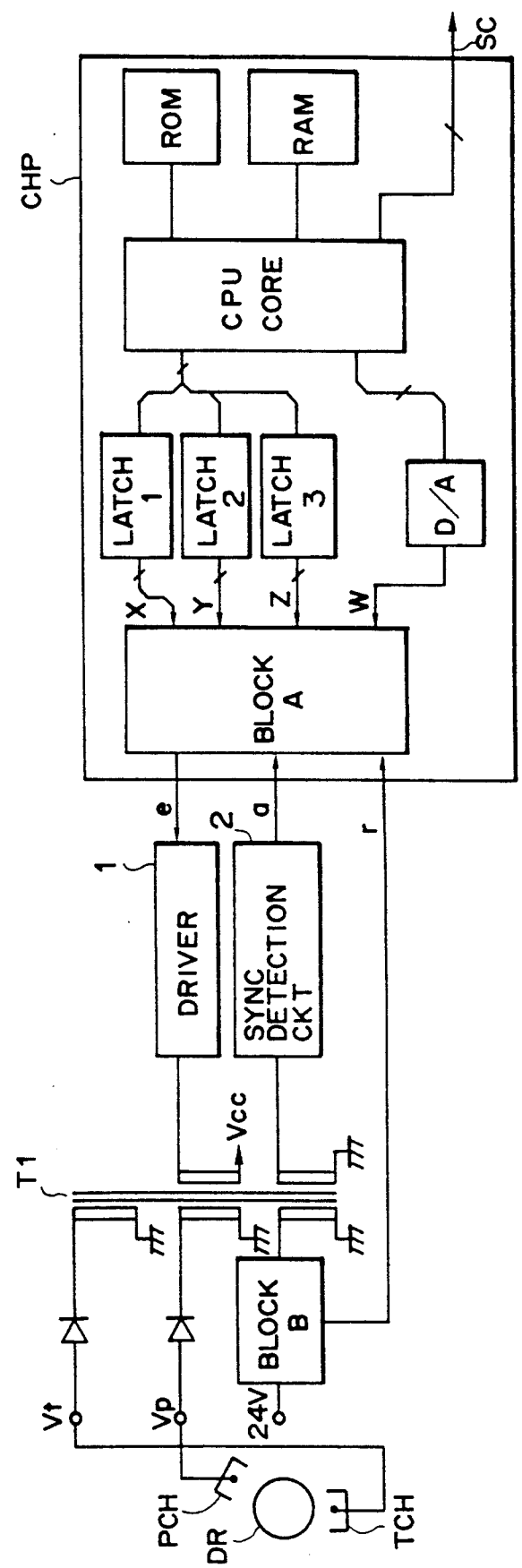
FIG. 14 is a circuit diagram of the main portion of a tenth embodiment.

FIG. 14 is a simple block diagram of the main portion of a tenth embodiment in which the block A of FIG. 9, a digital circuit such as a CPU core, ROM, RAM and the like and an analog circuit such as a D/A converter and the like are integrated on a single chip CHP. Almost all the power sources and sequences of a copy machine and printer can be controlled by this chip. The driver 1 of a transformer T1 is driven in response to a signal from the block A on the chip CHP and an output from the transformer T1 is used for a 24 V power source requiring a voltage of high accuracy, a Vp power source for a primary charging unit PCH, and Vf power source for a transfer charging unit TCH, but it may be also used for a power source for separation, development and the like.

The feedback voltage detection unit of a block B is provided with the 24 V power source unit requiring a voltage of high accuracy.

The primary charging unit PCH uniformly charges a drum DR and thereafter an image is exposed and developed, and then a developed image is transferred onto a recording paper by the transfer charging unit TCH.

On the other hand, the CPU core outputs the values X, Y, Z and W of control data of the block A in accordance with a program stored in the ROM and data in the RAM as well as outputs a sequence control signal SC for each portion of a copy machine to each external circuit to control a timing.

As described above, according to the sixth to tenth embodiments, since a detection signal is provided by capacitive coupling a signal obtained by rectifying an output from the secondary winding of the transformer and deriving the same through a filter including a differential element to a signal obtained by rectifying and smoothing the output from the secondary winding of the transformer, an output DC level can be correctly controlled to a set value and further the control system has a good responsive characteristic. Therefore, a power source device having a less amount of an output change and ripple and stably responsive to an abrupt change of load can be provided.

Further, when a level of a voltage obtained by rectifying and smoothing an output from the second secondary winding is below a predetermined value and a level of a detection signal is lowered, the voltage obtained by rectifying and smoothing the output from the second secondary winding is prevented from being extremely lowered. Therefore, an output compensation voltage and the like of the 3-terminal regulator connected to the second secondary winding can be ensured. Further, malfunction caused by noise can be prevented by restricting the count up and down of the up/down counter so that the transformer can be prevented from being magnetically saturated. Further, since the CPU for sequence control and the power source control circuit are integrated on the single chip, the size of the control circuit for performing power source control, sequence control and the like can be reduced.

Note, although the rectified and smoothed outputs derived from an output voltage in the two systems are superimposed by a capacitive coupling in the first through tenth embodiments, they may be superimposed through an addition circuit by using an operational amplifier or added after they are converted to digital signals.

It should be understood that the present invention is not limited to the above embodiments and various modifications may be made within the scope of the appended claims.

What is claimed is:

1. A power source device with a transformer, comprising:

a plurality of windings provided with a secondary of said transformer;

first and second smoothing means connected to a predetermined winding of said plurality of windings;

first voltage detection means for detecting a change of an output voltage from said first smoothing means;

means for superimposing an output from said first voltage detection means on an output from said second smoothing means; and feedback means, which is structured with a digital processing circuit, for feeding back a superimposed value to a primary of said transformer.

2. A device according to claim 1, wherein said second smoothing means and said first smoothing means each have a time constant, wherein a time constant of said second smoothing means is smaller than that of said first smoothing means.

3. A device according to claim 1, wherein said feedback means superimposes the output from said first voltage detection means on the output from said second smoothing means via a capacitive coupling.

4. A device according to claim 1, wherein said feedback means converts the superimposed value into a pulse-width signal and feeds back the same to the primary.

5. A device according to claim 1, wherein said transformer is a resonance-type flyback transformer.

6. A power source device with a resonance-type flyback transformer, comprising:
- a plurality of windings provided with a secondary of said transformer;
- first and second smoothing means connected to a predetermined winding of said plurality of windings;
- first voltage detection means for detecting a change of an output voltage from said first smoothing means;
- means for superimposing an output from said first voltage detection means on an output from said second smoothing means;
- sync-detection means for generating a synchronizing signal in accordance with an output of said transformer; and
- feedback means for feeding back a superimposed value obtained from said superimposing means to a primary of said transformer in synchronism with the synchronizing signal.

7. A power source device according to claim 6, wherein said second smoothing means and said first smoothing means each have a time constant, wherein a time constant of said second smoothing means is smaller than that of said first smoothing means.

8. A power source device according to claim 6, wherein said feed back means superimposes an output from said first voltage detection means on an output from said second smoothing means by a capacitive coupling.

9. A power source device according to claim 6, wherein said feedback means converts the superimposed value into a pulse-width signal and feeds back the same to the primary, such that a switching element for the primary winding is switched during an off-period of said transformer.

10. A device according to claim 6, wherein said feedback means is structured with a digital processing circuit.

11. A device according to claim 10, wherein said digital processing circuit generates a pulse-width modulated signal in accordance with the synchronizing signal and the superimposed value.

12. A power source device with a transformer having a plurality of outputs, comprising:
- first and second smoothing means connected to a predetermined first winding of a secondary of said transformer;
- a first voltage detection means for detecting a change of an output voltage from said first smoothing means;
- a superimposing means for superimposing a change of an output voltage from said second smoothing means on a detected voltage level detected by said first voltage detection means;
- a third smoothing means for at least one separate secondary winding of said transformer;
- a second voltage detection means for detecting a change of an output voltage from said third smoothing means;
- a switch means for lowering the detected voltage level detected by said first voltage detection means when the output voltage from said third smoothing means is lowered below a predetermined value; and
- a PWM means for feeding back the detected voltage level detected by said first voltage detection means to the drive circuit of a primary switching element of said transformer as an output voltage detection signal.

13. A power source device according to claim 12, wherein said second smoothing means and said first smoothing means each have a time constant, wherein a time constant of said second smoothing means is smaller than that of said first smoothing means.

14. A power source device according to claim 12, wherein said superimposing means superimposes an output from said first voltage detection means on a change of said second smoothing means by a capacitive coupling.

15. A power source device according to claim 12, wherein said PWM means, comprising:
- an analog comparator for comparing a voltage level detected by said voltage detection means with a predetermined value;
- an up/down counter the count up or count down of which is selected depending upon an output from said analog counter;
- a second counter for loading an output value from said up/down counter in response to a synchronizing pulse from a synchronization detection circuit for creating the synchronization pulse from a waveform of a predetermined winding of said converter transformer or an overcount signal of said second counter itself;
- a first digital comparator for comparing an output value from said second counter with a predetermined digital value;
- a function for outputting an output from said comparator to the drive circuit of a switching element for turning ON/OFF the primary of said converter transformer;
- a second digital comparator for comparing an output from said second counter with a predetermined digital value to thereby prohibit/permit the load operation of said counter performed in response to said synchronizing pulse; and
- a third digital comparator for comparing an output value from said up/down counter with a predetermined digital value to thereby prohibit/permit the count up operation of said up/down counter.

16. A power source device according to claim 12 further includes a CPU and a digital circuit annexed to it, and a D/A converter and an analog circuit annexed to it and said PWM control means, CPU, digital circuit, D/A converter and analog circuit are integrated on the same chip.

17. A power source device with a transformer, comprising:
- a first smoothing means for smoothing an output from a secondary winding of said transformer;
- a filter means for smoothing the output from said secondary winding and deriving the differential element of a smoothed output;
- a superimposing means for superimposing an output from said first smoothing means on an output from said filter means; and
- a means for feeding back an output from said superimposing means to a primary of said transformer, wherein said filter means comprises first and second RC parallel circuits connected in series, an end of said second RC parallel circuit is grounded, an end of said first RC parallel circuit serves as the input terminal of said filter means, and the common node of said first and second RC parallel circuits serves as the output terminal of said filter means.

18. A power source device according to claim 17, wherein said superimposing means superimposes an output from said first smoothing means on an output from said filter means by a capacitive coupling.

19. A power source device with a transformer, comprising:
   a detection unit for detecting an output from said transformer, said detection unit obtaining a detection signal by superimposing a signal obtained by rectifying an output from a first secondary winding of said transformer and deriving the same through a filter including a differential element on a signal obtained by rectifying and smoothing the output from said first secondary winding;
   a means for lowering a level of said detection signal when a level of a voltage obtained by rectifying and smoothing the output from a second secondary winding of said transformer is lowered below a predetermined value; and
   a means for feeding back controlling the primary of said transformer in accordance with the detected signal.

20. A power source device according to claim 19, comprising:
   an analog comparator for comparing a detected signal from said detection unit with a reference value;
   an up/down counter the up count or down count of which is selected depending upon an output from said analog comparator;
   a synchronization circuit for creating a synchronization signal from an output waveform of a predetermined winding of said transformer;
   a counter for loading an output value from said up/down counter depending upon the synchronization signal or an underflow or overflow of said counter itself;
   a first digital comparator for comparing an output value from said counter with a predetermined digital value;
   a switching element for turning ON or OFF the primary of said transformer depending upon an output from said first comparator;
   a second digital comparator for comparing the output from said counter with a predetermined digital value and prohibiting or permitting the load operation of said counter performed by said synchronization signal depending on the comparison output thereof; and
   a third digital comparator for comparing an output value from said up/down counter with a predetermined digital value and prohibiting or permitting the count up operation of said up/down counter depending upon a the comparison output thereof.

21. A power source device according to claim 20 further includes a CPU and the analog circuit of a D/A converter, wherein said CPU, analog circuit, analog comparator, up/down counter, first to third digital counters are integrated on the same chip.

* * * * *

UNITED STATES PATENT AND TRADEMARK OFFICE
CERTIFICATE OF CORRECTION

PATENT NO. : 5,285,368
DATED : February 8, 1994
INVENTOR(S) : TADASHI ISHIKAWA ET AL.

Page 1 of 2

It is certified that error appears in the above-identified patent and that said Letters Patent is hereby corrected as shown below:

COLUMN 3

Line 10, "for" should be deleted.
Line 17, "blow" should read --below--.
Line 51, "to" should be deleted.

COLUMN 4

Line 3, "filer" should read --filter--.

COLUMN 8

Line 35, "destroyed" should read --destroyed.--.

COLUMN 9

Line 55, "machines," should read --machine,--.

COLUMN 11

Line 40, "windin" should read --winding--.

COLUMN 12

Line 26, "does not become" should read --becomes--.
Line 34, "that" should be deleted.

UNITED STATES PATENT AND TRADEMARK OFFICE
CERTIFICATE OF CORRECTION

PATENT NO. : 5,285,368
DATED : February 8, 1994
INVENTOR(S) : TADASHI ISHIKAWA ET AL.

It is certified that error appears in the above-identified patent and that said Letters Patent is hereby corrected as shown below:

COLUMN 16

Line 20, "comprising:" should read --comprises:--.

COLUMN 18

Line 27, "the" should be deleted.

Signed and Sealed this

Thirtieth Day of August, 1994

Attest:

BRUCE LEHMAN

*Attesting Officer*   *Commissioner of Patents and Trademarks*